2 Sheets--Sheet 1.
E. S. RENWICK.
Grates.
No. 6,439. Reissued May 18, 1875.
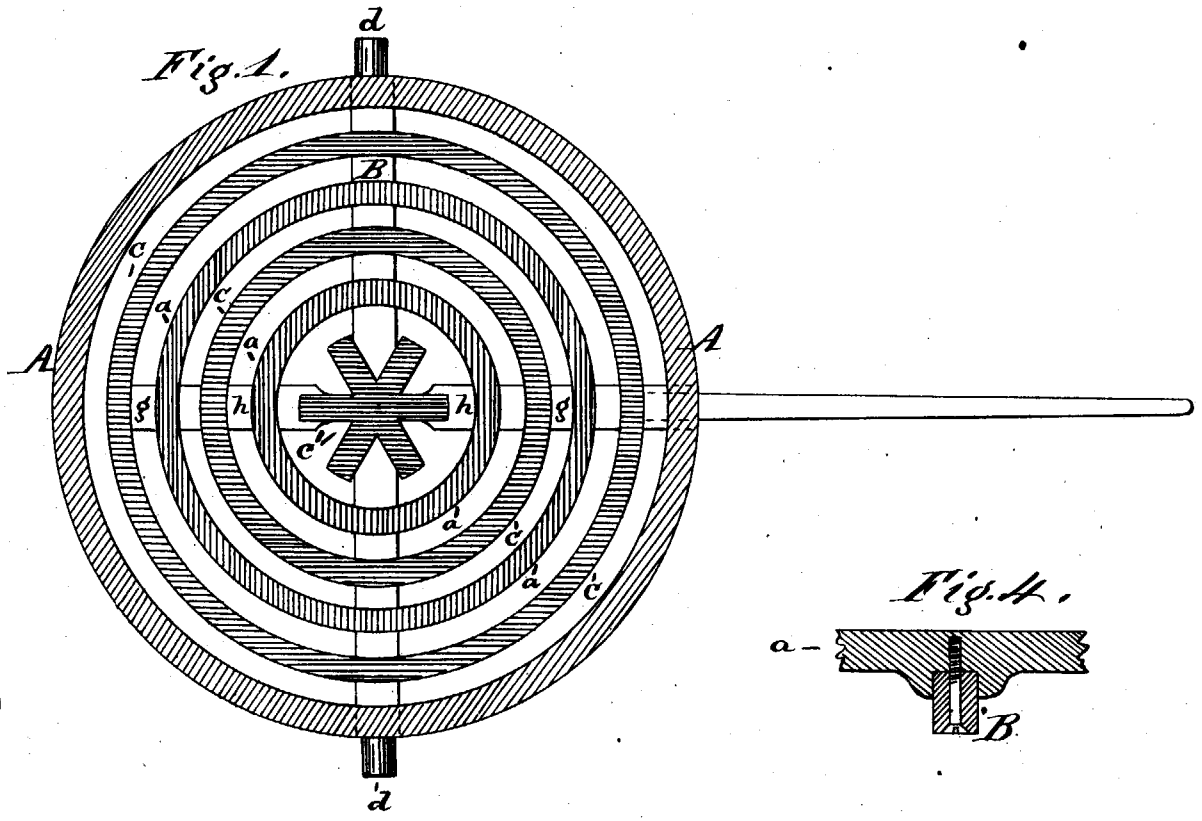
Witnesses
W. L. Bennem.
W. H. Isaacs.
Inventor
E. S. Renwick
THE GRAPHIC CO. PHOTO-LITH. 39 & 41 PARK PLACE, N.Y.

2 Sheets--Sheet 2.
E. S. RENWICK.
Grates.
No. 6,439.
Reissued May 18, 1875.
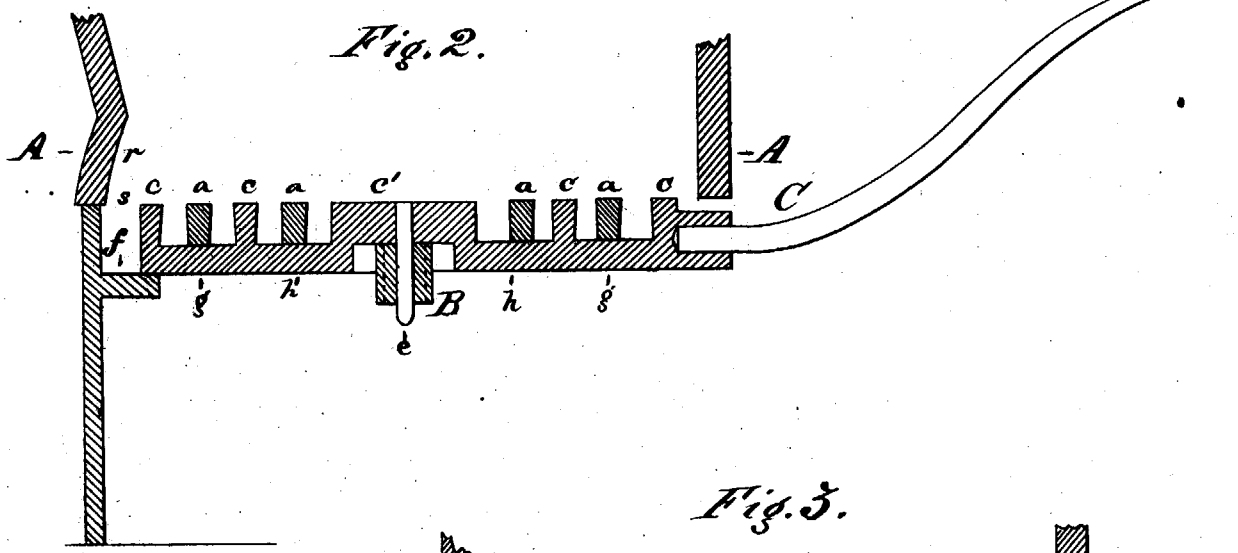
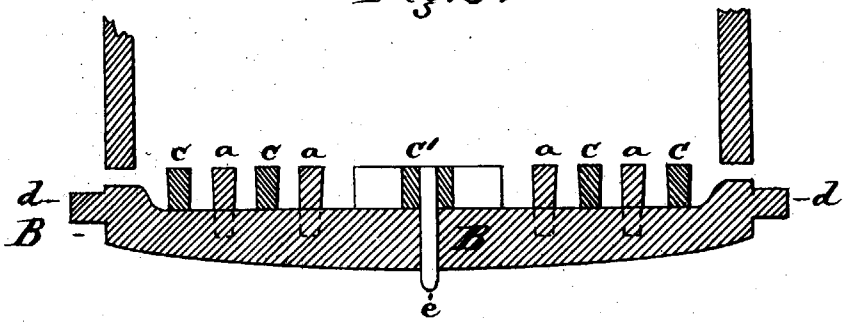
Witnesses
H. L. Bennett
W. H. Isaacs
Inventor
E. S. Renwick
THE GRAPHIC CO. PHOTO-LITH. 39 & 41 PARK PLACE, N.Y.

UNITED STATES PATENT OFFICE.

EDWARD S. RENWICK, OF MILLBURN, NEW JERSEY.

IMPROVEMENT IN GRATES.

Specification forming part of Letters Patent No. 87,112, dated February 23, 1869; reissue No. 6,439, dated May 18, 1875; application filed April 17, 1875.

*To all whom it may concern:*

Be it known that I, EDWARD SABINE RENWICK, formerly of the city, county, and State of New York, at present of Millburn, in the county of Essex and State of New Jersey, have invented certain new and useful Improvements in Grates for Furnaces, Stoves, and other apparatus for burning fuel; and that the following is a full, clear, and exact description and specification of my said invention.

The objects of the invention which constitutes the subject-matter of this patent are, to enable a round grate to be cleansed of ashes and of clinker with greater facility than heretofore. To this end my invention consists of certain combinations of the following members of a furnace—viz., a central hub constructed to turn upon an upright axis or pivot; one or more stationary circular grate-bars; one or more other grate-bars constructed to turn or vibrate upon a central axis or pivot; subjacent connections for the movable members of the grate, by which I mean connections extended underneath the stationary grate-bars, so that when the movable members are vibrated or moved circularly, the connections between them do not tend to move the coal; horizontal journals, which permit the grate-bars to be tipped to discharge the contents of the fire-box.

The combinations of the said members, which constitute the invention, are recited in detail at the close of this specification.

In order that my invention may be fully understood, I have represented in the accompanying drawings one of the modes in which all parts of the invention may be embodied in a practical form.

Figure 1 represents a horizontal section of the fire-pot of a hot-air furnace with the invention applied thereto. Fig. 2 represents a vertical transverse section of it crosswise to the tipping axis of the grate; and Fig. 3 represents a similar section of it through the tipping axis of the grate.

The drawings represent only such parts of a furnace as are necessary to enable the invention to be understood, the residue being constructed in any suitable manner.

The fire pot or box A is of a circular form, and the grate is composed of two parts or sets of grate-bars, both circular and concentric with the axis of the fire-pot. One set of the grate-bars, *a a*, is prevented from turning in a horizontal plane by being secured to a rock-shaft, B. The other set, *c c*, and the central hub *c'*, are constructed to turn upon a pivot, *e*, which is vertical, or perpendicular to the plane of the grate, and is sustained by the rock-shaft B, so that this set and the hub may be turned or vibrated in a horizontal plane. In order that the central hub *c'* and the movable grate-bars *c* may be turned or vibrated on their pivot simultaneously, the central hub *c'* is connected with the movable bars by the connections *h h*, and the movable bars are connected with each other by the connections *g g*.

All these connections are subjacent to the stationary bars *a a*, being under them in contradistinction to being extended over those bars; consequently, these subjacent connections do not interfere with the coal in the fire-pot when the movable bars and hub are turned circularly in a horizontal plane.

The movable set of bars is provided with a socket, to which a lever, C, may be applied, and by which the movable set may be turned in a circular direction.

The rock-shaft B terminates at its ends in journals *d d*, which are sustained in suitable bearings, sustained by the walls of the ash-pit of the furnace; hence, the whole grate may be tipped upon the axis of said journals, as a tipping-axis, the front side of the grate being depressed, and the rear side rising, for the purpose of discharging the contents of the fire-pot.

In order to prevent the grate from being tipped in the wrong direction, guard *f* is secured to the rear wall of the ash-pit, beneath the rear side of the grate; and, in practice, I prefer to arrange the tipping axis a little nearer the front of the grate than the rear side thereof, so that the preponderance of weight at the rear of the tipping-axis will prevent the accidental tipping of the grate.

In order to facilitate the removal of clinkers without discharging all the contents of the fire-pot I contract the side of the fire-pot at *r*, adjacent to the rising side of the grate, making it, by preference, concentric or thereabout with the tipping-axis of the grate; hence, when the grate rises at that side, by the act of tipping, the space *s* does not increase in width, and, consequently, no pieces of coals or other material can pass into that space which will not pass through it when the grate is restored to a horizontal position. This contracted form of fire-pot does not, however, constitute any part of the invention claimed by me.

In practice, I prefer to cast all the parts of the movable part of the grate in one piece, and to secure the members of the stationary part to each other by lugs or by screws. (See Fig. 4.) In hot-air furnaces set in brick casings, where the fire-pot is at a considerable distance from the face of the casing, I connect the movable part of the grate with a rock-shaft by means of a link, and dispense with the direct application of the lever C to the movable part. In such a furnace the rock-shaft may extend through the ash-pit perpendicular to the face of the casing, and may be fitted at its front end with a shaking-lever; or the rock-shaft may be placed in front of the casing, with its axis parallel thereto, and the link may extend through a hole in the front of the ash-pit from an arm of the rock-shaft to a lug projecting from the movable part of the grate in the vicinity of the rock-shaft B. The rock-shaft at the front of the casing is then provided with a shaking-lever.

The efficiency of the apparatus may be increased by forming the upper surface of the movable bars with projections.

I am aware that circular grates have been made to tip upon a horizontal axis long prior to my invention, and that the entire grate has been constructed to turn or vibrate altogether upon a vertical axis as well as to tip upon a horizontal axis. I do not, therefore, claim such constructions; but

What I claim as my invention, and desire to secure by Letters Patent, is—

1. The combination, substantially as before set forth, of the central hub, turning on an upright axis, the stationary circular grate-bar, the movable grate-bar, and the subjacent connections between the turning hub and the movable grate-bar.

2. The combination, substantially as before set forth, of the stationary circular grate-bar, two movable grate-bars, constructed to turn on an upright central axis, and the subjacent connections between the movable grate-bars.

3. The combination, substantially as before set forth, of the central hub, turning on an upright axis, the stationary circular grate-bar, the movable grate-bar, the subjacent connections between the central hub and the movable grate-bar, and the journals upon which the grate may be tipped.

4. The combination, substantially as before set forth, of the stationary circular grate-bar, two movable grate-bars, constructed to turn upon an upright axis, the subjacent connections between the said movable grate-bars, and the journals upon which the grate may be tipped.

Witness my hand this 2d day of February, A. D. 1875.

E. S. RENWICK.

Witnesses:
W. L. BENNEM,
W. H. ISAACS.